Aug. 19, 1958  W. W. FAVRE ET AL  2,847,884
DEBURRING ATTACHMENT FOR ROTARY DRILLS
Filed March 30, 1956

INVENTORS
**WOODROW W. FAVRE
HARRY B. SADLER**
BY *Semmes & Semmes*

ATTORNEYS

United States Patent Office 2,847,884
Patented Aug. 19, 1958

2,847,884

DEBURRING ATTACHMENT FOR ROTARY DRILLS

Woodrow W. Favre and Harry B. Sadler, Baltimore, Md.

Application March 30, 1956, Serial No. 575,270

6 Claims. (Cl. 77—66)

The present invention relates broadly to drilling tools and more specifically to a deburring attachment for rotary drills.

As is well known, when using high speed drills for tapping or drilling holes in metals such as soft metals and other materials, the drills will form a burr or curl of metal on the front or upper surface of the material, and an additional burr at the back side or bottom of the material. In many industries, and particularly in the aircraft industry or the like, such burrs are very undesirable especially where flush riveting for example, is to be employed. Consequently, in such industries, for example, it is necessary after drilling holes in the sheet material to then follow with a separate operation of deburring around the holes before the structure can be completed. This is not only time consuming, but very expensive.

It is an object, accordingly, of the present invention, to provide a deburring attachment for rotary drills which will deburr both the front and back sides of holes drilled in sheet metal, or other sheet materials, all in a single operation, as a continuance of the drilling operation, and eliminating the necessity of a separate operation.

Another object of the present invention is to provide such a deburring attachment for rotary drills which is automatically operable upon insertion of a drill shank through a drilled hole to swing or move the deburring attachment into operative position through contact with the material, and which is thereafter swung into inoperative position by the same means.

A still further object of the present invention is to provide a deburring attachment for tools which will deburr both surfaces of the material surrounding a hole drilled therein simultaneously.

Another object of the present invention is to provide a deburring attachment for tools which employs centrifugal force to maintain it in open, or inoperative position, and which employs a single surface as a lever and cutting blade to move the attachment to operative or cutting position.

A still further object of the present invention is to provide a deburring attachment for rotary drills having upper and lower cutting blades for employing a squeezing action upon the upper and lower surfaces of the material by rotation upon its axis.

A still further object of the present invention is to provide a deburring attachment for rotary drills which can be operated to countersink or counterbore the upper surface of a material while deburring the lower surface thereof.

An additional object of the present invention is to provide such a deburring tool which is of simple design and inexpensive to manufacture and is capable of long and continuous use.

Other objects and advantages of the present invention will be more readily apparent from the following detailed description of embodiments thereof, when taken together with the accompanying drawings, in which.

Figure 1:
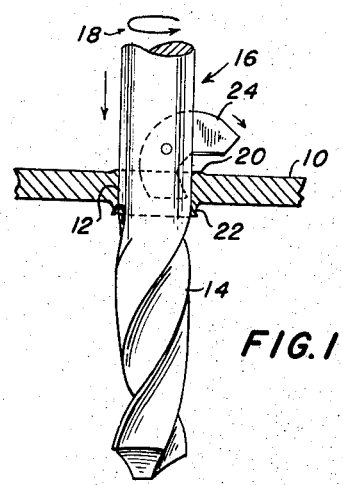
Fig. 1 is a fragmentary elevational view of the device prior to insertion of the deburring attachment in the drilled hole.

In the drawings, a piece of metal or other material is shown at 10, through which a hole 12 has been drilled by the cutting portion 14 of drill 16, the direction of rotation thereof being indicated by the arrow 18. As seen in Fig. 1 of the drawings, and as well known in the trade, the drill, when drilling the hole 12 leaves on the front or upper surface of the metal a burr or curl of metal 20, and at the back side or bottom edge of the hole, the metal will form an additional burr 22.

In Fig. 1, the deburring attachment 24 is just entering the hole, which has been drilled. As will be explained hereinafter, the deburring attachment, due to its configuration and shape is maintained in the inoperative position shown in Fig. 1 until after the leading portion thereof has passed through the hole and thereafter, by coaction between the material being drilled and the deburring attachment, the deburring attachment will automatically move into the position shown in Fig. 2. The burrs 20 and 22 will then be effectively removed by the cutting edges of the deburring attachment.

Figure 3:
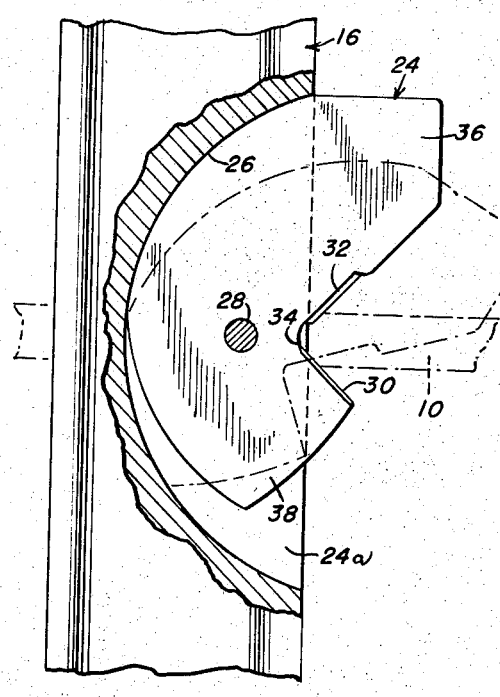
Fig. 3 is a fragmentary enlarged view of a drill bit showing details of the deburring attachment which is secured thereto.

In the embodiment of the invention shown in Fig. 3, a portion of the shank of the drill 16 is shown and the metal 10 is indicated in dotted lines. It will be noted that only a short length of the drill is provided with a cutting edge since for the most part, thin material is contemplated. An arcuate slot 24a is provided in the drill shank above the cutting edges and the deburring attachment 24, which is of thin, high-grade steel, has a rear arcuate shaped edge 26, corresponding with the shape of the slot, as can be seen from the drawing. The attachment 24 is pivotally mounted in the slot by means of a pin or rivet 28, which need not pass completely through the shank, but can extend from one side just past the far side of the slot. This is for the purpose of strength in the shank. The outer edge or surface of the deburring attachment 24 is provided with a first cutting edge 30 which is bevelled, as shown, to afford a good cutting action and also provide a clearance angle, and a second cutting surface is provided at 32, which is also bevelled, and disposed at an angle to the first cutting edge 30. The angle of bevel can vary depending on the depth of cut desired. Between the cutting edges 30 and 32, a plain intermediate surface 34 is provided. The dimensions of this intermediate surface 34 are such that when the deburring attachment is in operative position within the hole being drilled in the metal, the cutting edges 30 and 32 will remove the burrs 20 and 22 and if desired, can at the same time countersink one or both surfaces of the metal.

The head or upper end 36 of the deburring attachment is of larger dimensions than the base or lower end 38. The lateral dimension of the lower end 38 is such that when the deburring attachment is in the position shown in Fig. 1, or in dotted lines in Fig. 3, the entire end 38 will be confined within the slot 24a. When the drill is rotating when drilling the hole, centrifugal force will cause head 36 to rotate around pin 28 to outward position and thereby maintain base 38 in retracted position indicated by dotted lines in Fig. 3 and cutter edge 32 is wholly contained in the slot. Therefore, as the drill passes down through the metal, and after the hole has been drilled, the base end 38 will pass through the hole. Upon further insertion of the drill, the material surrounding the hole will contact the edge 32 and upon continued pressure will force the deburring attachment into the position shown in Fig. 2, and in full lines in Fig. 3. The two cutting edges 30 and 32 will, accordingly, act on the metal to remove the burrs 20 and 22 in a readily understandable manner.

Figure 4:
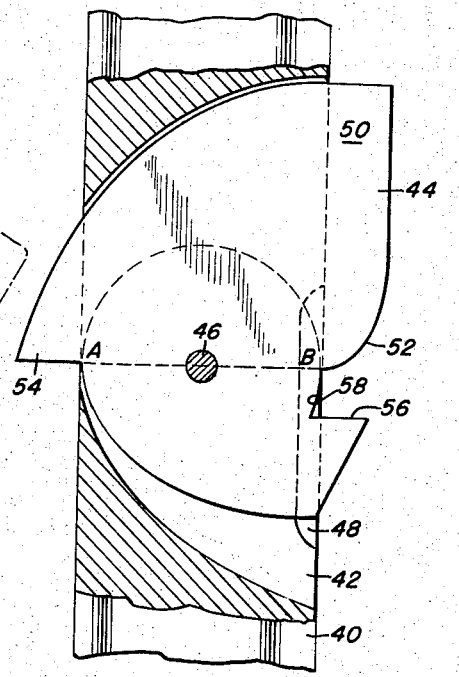
Fig. 4 is a view similar to Fig. 3, but showing a modified form of deburring attachment.

In the modification shown in Fig. 4 of the drawings, the drill shank 40 is provided with a slot 42 which extends completely through the shank. The deburring attachment 44 is inserted in this slot and pivotally mounted by means of pivot 46. A relief 48 is provided in the drill shank 40 adjacent the slot 42 and is on the leading edge of the slot. This is to permit the cutting edges to be positioned out from the face of the slot leaving an air space in front of the cutters to prevent jamming by metal chips cut by the cutter blades. On the head or upper end 50 of the attachment, a cutter blade or edge is provided at 52, which is an involute curve whose evolute is the semi-circle from A to B. Pin 46 is in the center of the shank and on a line between A and B. The base of the curve of cutter blade 52 and an additional cutter blade 54 at the rear end of the attachment are on the same line A—B. This permits the cutting edge at 52 to always be in contact with the material at the edge of the hole.

The lower cutter edge 56 is similar to the cutting surface 32 of the first embodiment, and an intermediate surface is provided as shown at 58. The cutter blade 54 may be omitted if desired, and then the slot would not penetrate through the drill shank, but would only extend into the shank, as in the embodiment of Fig. 3.

Figure 2:
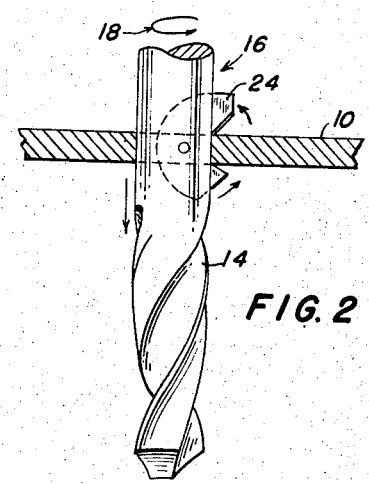
Fig. 2 is a view similar to Fig. 1, but showing the deburring attachment in operative position in the drilled hole.

The operation of this embodiment of the invention is substantially the same as that shown in Figs. 1 to 3, but of a slightly different design which for some purposes might be more desirable.

The functioning of the deburring attachment will be readily apparent from the foregoing description, but briefly, when the drill rotates or revolves, centrifugal force will cause the heads of the cutter or deburring attachment to rotate around the pins to the outward position as shown in Fig. 1. In this position of the attachment, the base thereof is firmly held against the base of the slot and the lower cutter blade is retracted into the slot completely, while the upper cutter blade is in cutting position. When the drill sinks into the hole, the material surrounding the hole will come in contact with the upper cutter blade and then as pressure is applied, this upper cutter blade begins to shear off the burr on the top side of the material and retreat into the slot forcing the lower cutter blade out of the slot and into the position shown in Fig. 2 where it shears off the burr on the underside of the material. The drill after this deburring operation, is then removed from the hole. Thus, in a single continuous action, a hole is drilled and the two surfaces are deburred and, if desired, the hole can at the same time be countersunk.

Manifestly, many changes in details of construction will be apparent to those skilled in the art to which the invention pertains, without departing from the scope and spirit thereof as defined in and limited solely by the appended claims.

We claim:

1. In combination, a rotary drill having an elongated slot extending radially into the shank thereof and a deburring attachment pivotally mounted in said slot, the pivotal point of said deburring attachment being so located on the attachment that the lower extremities of the deburring attachment are located at a shorter radial distance from the said pivot point than the upper extremities thereof, two spaced angularly disposed cutting edges on said attachment on opposed sides of the pivotal mounting and on the front face of said attachment and adapted for cutting action on opposed sides of material being drilled, centrifugal force produced on rotation of the drill moving one said cutting edge out of said slot, the other said cutting edge being extendable out of said slot on contact of said one cutting edge with material being drilled.

2. A deburring attachment for rotary drills having an elongated slot extending radially into the shank thereof comprising a cutter pivotally mounted in said slot, the pivotal point of said deburring attachment being so located on the attachment that the lower extremities of the deburring attachment are located at a shorter radial distance from the said pivot point than the upper extremities thereof, said cutter having an upper head portion and a lower base portion, said head portion being larger than said base portion and extending out of said slot, cutting edges on the front faces of said head and base portions disposed at an angle to each other and spaced apart, for cutting action on opposed surfaces of a material being drilled, centrifugal force produced on rotation of the drill moving said head portion outwardly and withdrawing said base portion wholly within said slot, said base portion being extendable out of said slot on contact of said head cutting edge with material being drilled.

3. A deburring attachment as claimed in claim 2, said cutting edge on said head constituting a cutting blade and a lever for pivoting said cutting edge on said base into operative cutting position.

4. A deburring attachment as claimed in claim 2, said slot having an arcuate base and said cutter having an arcuate rear edge, said arcuate base constituting a stop for said rear edge for limiting outward extension of said cutter base portion.

5. A deburring attachment as claimed in claim 2, said slot extending diametrically through said shank, said cutter being mounted centrally of said shank, a third cutting edge disposed on the opposite side of said cutter from said cutting edge on said head and the bases of said cutting edges being in a line extending through the center of the pivotal mounting.

6. A deburring attachment as claimed in claim 2, and a relief being formed in said shank contiguous with said slot on the leading edge thereof whereby said cutting edges are spaced from the face of said slot leaving an air space in front of the cutter to prevent jamming by metal chips.

References Cited in the file of this patent

UNITED STATES PATENTS

| | | |
|---|---|---|
| 2,257,402 | Scott et al. | Sept. 30, 1941 |
| 2,437,822 | Jones | Mar. 16, 1948 |
| 2,461,431 | Millheam | Feb. 8, 1949 |